Jan. 19, 1932. J. L. DRAKE 1,841,576
METHOD AND APPARATUS FOR PRODUCING SHEET GLASS
Filed March 10, 1930
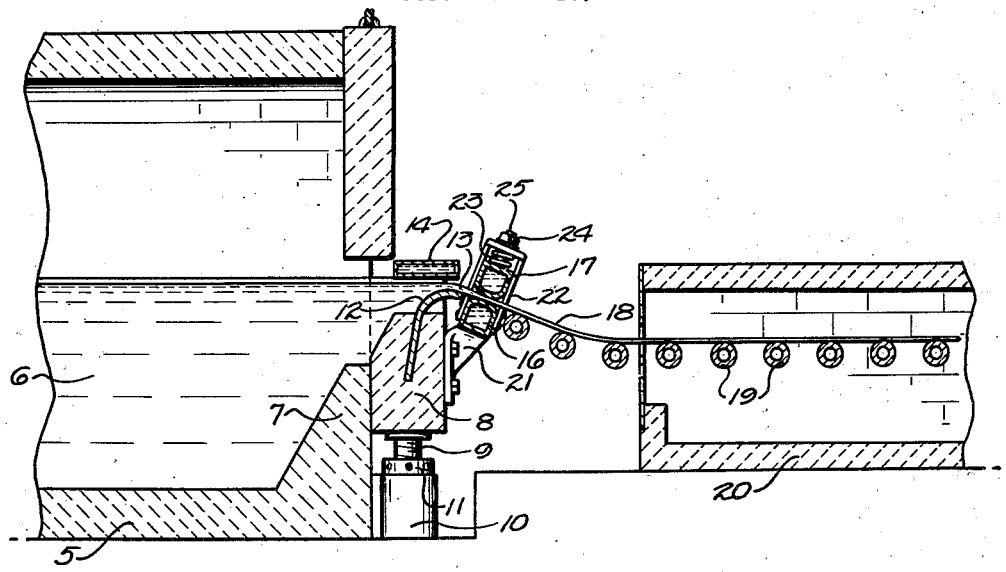
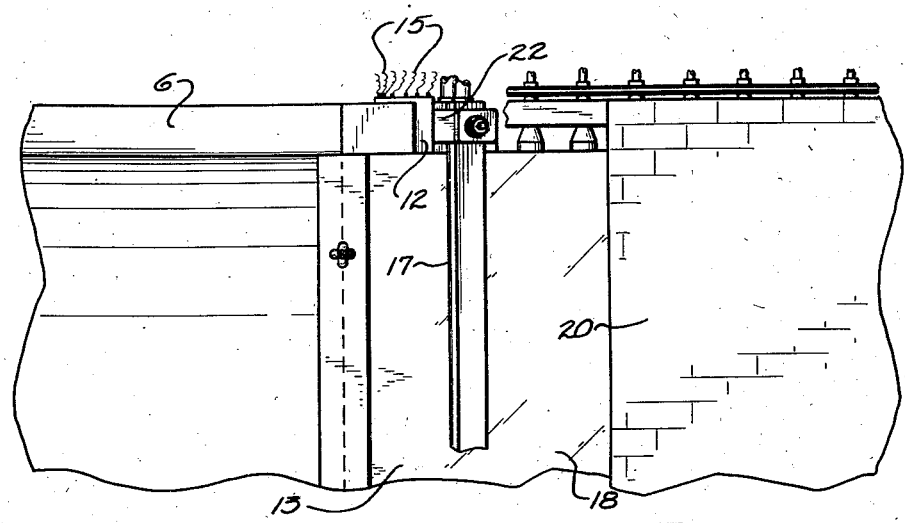
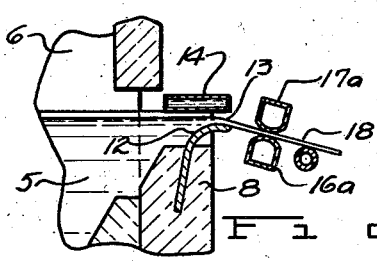
Inventor
John L. Drake
By Frank Fraser
Attorney Patented Jan. 19, 1932

1,841,576

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

METHOD AND APPARATUS FOR PRODUCING SHEET GLASS

Application filed March 10, 1930. Serial No. 434,514.

The present invention relates to a method and apparatus for producing sheet glass.

An important object of the invention is the provision of such a method and apparatus for improving the quality of sheet glass by minimizing the formation of waves or other surface irregularities or defects therein as it is being formed.

Another object of the invention is the provision of such a method and apparatus wherein the opposite surfaces of an advancing stream of molten glass are simultaneously submitted to a wiping or smoothing action to flatten or iron out any surface irregularities present therein.

Another object of the invention is the provision of such a method and apparatus wherein the opposite surfaces of the advancing stream of molten glass are not only submitted to a wiping or smoothing action but wherein the stream is simultaneously reduced to a sheet of substantially predetermined and uniform thickness.

A further object of the invention resides in the provision of stationary means engaging opposite surfaces of an advancing stream of molten glass for simultaneously reducing said stream to a sheet of substantially predetermined thickness and submitting it to a wiping or smoothing action to the end that a flat, smooth and uniform thickness of sheet may be produced.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through apparatus constructed in accordance with the present invention, Fig. 2 is a plan view of a portion thereof, and Fig. 3 is a sectional view of an alternative arrangement.

Referring now to the drawings, 5 designates a furnace within which is adapted to be produced a mass of molten glass 6. The front wall of the furnace consists of a lower stationary portion 7 and a vertically movable portion 8 arranged outwardly thereof and projecting upwardly therebeyond, said movable portion being supported upon jackscrews 9 received within members 10 and adjustable by means of nuts 11. Carried by the movable wall portion 8 is a metallic lip member 12 having a substantially vertically arranged portion embedded within said movable wall portion and the upper end thereof being directed forwardly as shown. The movable wall portion 8 is adjusted vertically in such a manner that a stream of molten glass 13 of the desired thickness will flow from the furnace over the lip member 12, with the upper surface of the glass stream being conditioned and the viscosity thereof controlled by the provision of a horizontal cooler 14 spaced thereabove. The lip member 12 is of a suitable non-corrosive metal and is adapted to be heated preferably by the passage of an electric current therethrough. This current can be caused to enter the lip member at one end through a plurality of wires 15 and to discharge therefrom at the opposite end in a similar manner.

Arranged in opposition to the lip member 12 are the substantially superposed stationary members 16 and 17, said members being spaced from one another to create a sheet forming pass therebetween through which the stream of molten glass 13 is passed and reduced to a sheet 18 of substantially predetermined and uniform thickness, said sheet being supported and carried along upon a series of rolls 19 into and through an annealing leer 20. The members 16 and 17 extend throughout the width of the glass stream 13 and are in the form of substantially rectangular hollow casings through which is adapted to be circulated a suitable cooling medium such as air, water etc. These members are preferably formed from a suitable non-corrosive metal such as Monel, nichrome or the like and the top and bottom walls of members 16 and 17 respectively are also preferably arcuately curved transversely as shown so as to reduce the area of contact between said members and the glass. The members 16 and 17 not only function to reduce the glass stream to a sheet of substantially predetermined thickness but further produce a wiping or smoothing action thereupon tending to flatten or iron out any surface irregularities or defects therein so that a flat, smooth and uniform thickness of sheet may be produced.

The members 16 and 17 are carried by the adjustable wall portion 8 and movable therewith as a unit. Thus, the bottom member 16 is fixedly carried by brackets 21 secured to the wall 8, while the member 17 is slidably mounted at its opposite ends within guide-members 22 carried by member 16. The member 17 is normally urged toward member 16 by the provision of compression springs 23 at the opposite ends thereof. The inward movement of the member 17, however, is limited by an adjusting mechanism including a nut 24 threaded upon bolt 25 carried by the member 17 and projecting outwardly through the end of the respective guide-member 22. Thus, while the member 17 is yieldably urged toward member 16 it can be readily moved away therefrom to permit the passage of clay or other foreign matter therebetween.

The provision of the metallic lip member 12 also constitutes an important feature of the present invention. Heretofore, in the construction of glass melting furnaces adapted for supplying molten glass to sheet glass forming mechanism, it has been customary for the overflow lips to be constructed of a refractory clay material with the result that there was a tendency for the molten glass flowing thereover to stick or adhere thereto and after a time this glass adhering to said lip would become devitrified and form so-called dog metal which was obviously objectionable since it had a tendency to injuriously affect the quality of the glass passing to the forming mechanism and, in addition, necessitated periodic cleaning of the overflow lip to remove the devitrified glass therefrom. Also, the refractory clay lip would gradually wear away causing lines and other defects in the glass. However, with the provision of the electrically heated metallic lip described above, the glass will be permitted to slide or flow freely thereover to the sheet forming means and there will be no tendency for the glass to stick or adhere thereto and become hardened or devitrified. This will result in the delivery of glass of a greatly improved quality to the sheet forming means, and as the lip will always remain free of adherent glass, it will not be necessary for the said lip to be periodically scraped or cleaned. In addition, the metallic lip will also have a wiping or smoothing action upon the glass passing thereover and will thereby assist in the removal of surface irregularities therefrom.

The arrangement illustrated in Fig. 3 is substantially the same as that in Fig. 1, the principal difference being that the members 16a and 17a herein provided and corresponding to members 16 and 17 above described have been moved further away from the lip member 12 so as to engage opposite surfaces of the glass after it has been reduced to sheet form. In other words, the thickness of the sheet is here determined mainly by a drawing or stretching action, and the members 16a and 17a do not function as sheet forming members but, on the other hand, engage the sheet after it has been formed to remove therefrom any surface defects or irregularities present therein. The top and bottom walls of the members 16a and 17a respectively are also arcuately curved transversely so that they have substantial line contact with the sheet so as to reduce the area of contact between said members and sheet.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus of the character described, a furnace having a metallic overflow lip at one end thereof over and in contact with which a stream of molten glass is caused to flow, and stationary members arranged in opposition to said lip and engaging opposite surfaces of the stream for producing a wiping action thereon to remove surface irregularities therefrom.

2. In apparatus of the character described, a furnace having a metallic overflow lip at one end thereof over and in contact with which a stream of molten glass is caused to flow, and stationary members arranged in opposition to said lip for receiving the stream therefrom and reducing it to a sheet of substantially predetermined and uniform thickness whereby the sheet passing from said stationary members will be of a thickness relatively less than that of the stream flowing thereto.

3. In apparatus of the character described, a furnace having a movable wall portion, a metallic lip member carried by the wall portion and over which a stream of molten glass is adapted to flow, and stationary members carried by said wall portion for receiving the stream of molten glass therebetween and reducing it to a sheet of substantially predetermined thickness whereby the sheet passing from said stationary means will be of a thickness relatively less than that of the stream flowing thereto.

4. In apparatus of the character described, a furnace having a movable wall portion, a metallic lip member carried by the wall portion and over which a stream of molten glass is adapted to flow, stationary members carried by said wall portion and engaging opposite surfaces of the glass stream, and means for adjusting the wall portion, lip and stationary members vertically as a unit.

5. The method of producing sheet glass, which consists in advancing a stream of molten glass in a generally horizontal direction, passing said stream over an electrically heated stationary non-corrosive surface, in then passing the stream between stationary non-corrosive surfaces to remove surface irregularities therefrom, and simultaneously reducing the stream during such wiping action to a sheet of substantially predetermined and uniform thickness so that the said sheet passing from said surfaces will be of a thickness relatively less than that of the stream flowing thereto.

Signed at Toledo, in the county of Lucas and State of Ohio, this 7th day of March, 1930.

JOHN L. DRAKE.